United States Patent [19]

Opitz et al.

[11] 4,319,880

[45] Mar. 16, 1982

[54] MONOAZO DYESTUFF BEING STABLE UNDER DYEING CONDITIONS; ITS MANUFACTURE AND ITS USE

[75] Inventors: Konrad Opitz, Liederbach; Rudolf Schickfluss, Kelkheim, both of Fed. Rep. of Germany

[73] Assignee: Hoechst Aktiengesellschaft, Frankfurt am Main, Fed. Rep. of Germany

[21] Appl. No.: 152,552

[22] Filed: May 23, 1980

[30] Foreign Application Priority Data

May 25, 1979 [DE] Fed. Rep. of Germany ....... 2921210

[51] Int. Cl.³ .................... C09B 67/00; D06P 67/02
[52] U.S. Cl. .................................... 8/526; 8/662; 260/207.5; 260/208
[58] Field of Search ................. 8/526, 662; 260/207.5, 260/208, 207.1

[56] References Cited

U.S. PATENT DOCUMENTS 2,007,382  7/1935  Ockman et al. ................... 8/526
3,407,189  10/1968  Merian ............................. 260/207.1
4,074,965  2/1978  Kruse et al. ...................... 8/662

FOREIGN PATENT DOCUMENTS 1619535  5/1971  Fed. Rep. of Germany .
2536052  2/1977  Fed. Rep. of Germany .
852396  10/1960  United Kingdom .
1543316  4/1979  United Kingdom .

OTHER PUBLICATIONS

Samoilova, G. V. et al., Chemical Abstracts, 1979, 90, (No. 16), 123029g.

*Primary Examiner*—A. Lionel Clingman
*Attorney, Agent, or Firm*—Curtis, Morris & Safford

[57] ABSTRACT

Figure 1:
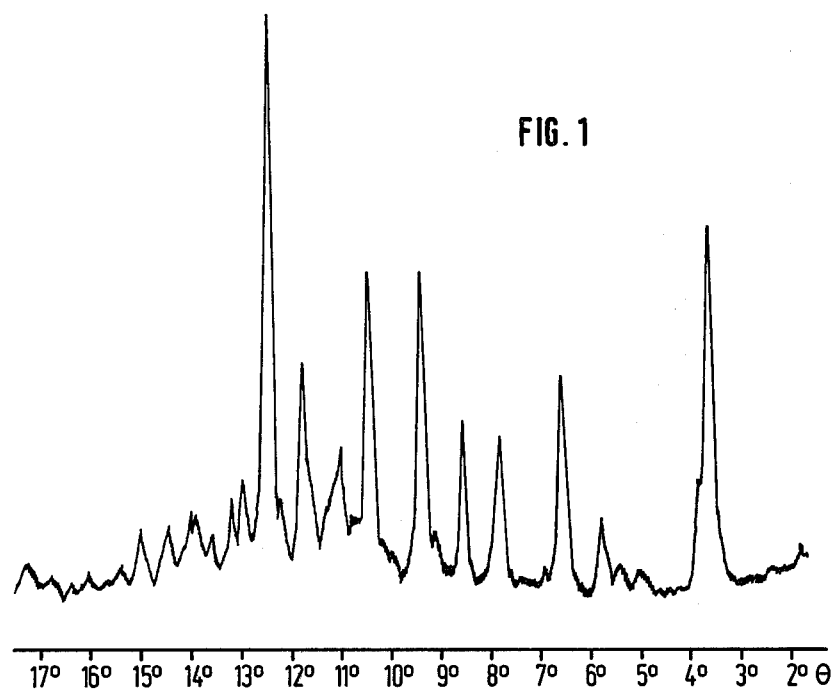

The invention relates to a novel crystallographic modification ("β-modification") being stable under dyeing conditions of the dyestuff of the formula

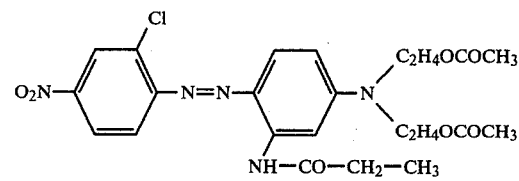

which is characterized by an X-ray diffraction pattern as shown in FIG. 1 with characteristic reflexes at the following glance angles θ (CuKα radiation) with the relative intensities:

| θ | 3.71 | 6.62 | 7.85 | 8.6 | 9.43 | 10.51 | 11.8 | 12.57 |
|---|------|------|------|-----|------|-------|------|-------|
| relat. intensity | 67 | 44 | 34 | 36 | 60 | 60 | 46 | 100 | to processes for their manufacture and to their use for dyeing fibrous materials of cellulose esters or of synthetic linear polyesters or blended fabrics of these polyesters and wool or rayon.

1 Claim, 2 Drawing Figures

MONOAZO DYESTUFF BEING STABLE UNDER DYEING CONDITIONS; ITS MANUFACTURE AND ITS USE

The present invention relates to a novel crystallographic modification ("β-modification") being stable under dyeing conditions of the dyestuff of the formula

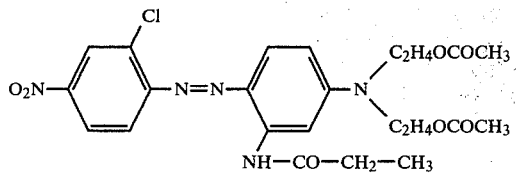

which is characterized by an X-ray diffraction pattern as shown in FIG. 1 with characteristic reflexes at the following glance angles θ (CuK$_\alpha$ radiation) with the relative intensities:

| θ | 3.71 | 6.62 | 7.85 | 8.6 | 9.43 | 10.51 | 11.8 | 12.57 |
|---|---|---|---|---|---|---|---|---|
| relat. intensity | 67 | 44 | 34 | 36 | 60 | 60 | 46 | 100 |

The dyestuff of the said formula is obtained by diazotizing 2-chloro-4-nitroaniline in aqueous hydrochloric acid and by coupling the resulting diazonium compound to 3-(N,N-diacetoxyethyl)aminopropionic acid anilide dissolved in dilute hydrochloric acid. This process yields the α-modification unstable under dyeing conditions, whose stability under the conditions existing in dyeing practice is unsatisfactory.

Figure 2:
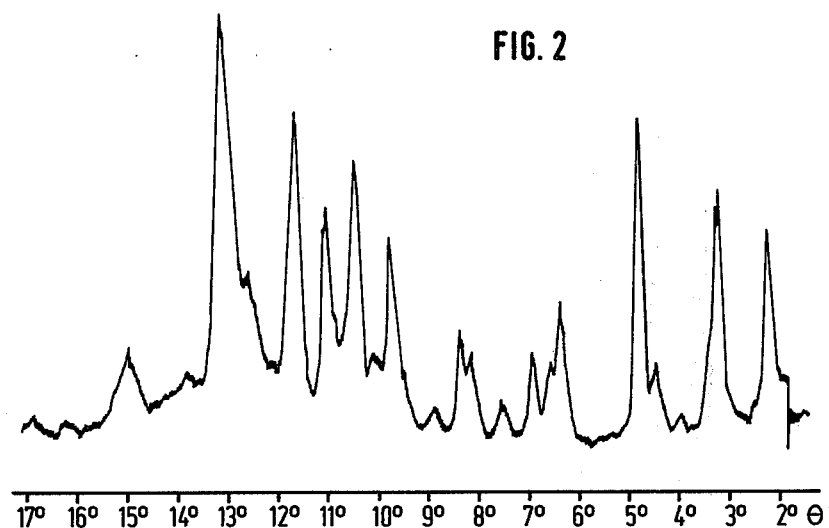

The α-modification is characterized by the X-ray diffraction pattern as shown in FIG. 2 with the characteristic-reflexes at the following glance angles θ(CuK$_\alpha$ radiation) with the relative intensities:

| θ | 2.29 | 3.26 | 4.85 | 9.78 | 10.52 | 11.1 | 11.7 | 13.2 |
|---|---|---|---|---|---|---|---|---|
| relative intensity | 50 | 58 | 71 | 49 | 64 | 55 | 73 | 100 |

The crystal size and the crystal form of the β-modification being stable under dyeing conditions (hereinafter named fast-to-dyeing β-modification) do not change practically when dyeing at high temperature in the presence of dyeing auxiliaries so that the coloring properties and the stability of the dispersion are not impaired, contrary to what has been observed when dyeing with the α-modification being unstable under dyeing conditions. For example, it has been observed that the fast-to-dyeing β-modification yields liquid preparations of an improved stability to storage.

The novel fast-to-dyeing β-modification may be obtained by heating an aqueous suspension of the α-modification for at least 2 hours, optionally under pressure, to 60°-130° C.

Alternatively, the α-modification may be converted into the fast-to-dyeing β-modification by heating in aqueous suspension, with the addition of water-soluble organic solvents, for example ethanol or glycol.

The fast-to-dyeing β-modification may be further obtained by heating an aqueous suspension of the α-modification with the addition of anionic, cationic or non-ionic surface-active compounds at a temperature from about 80° to 100° C. Suitable surface-active compounds are, for example, the sodium salt of diisobutyl-naphthalene-sulfonic acid, the addition products of 25 mols of ethylene oxide to 1 mol of stearyl alcohol, a mixture of alkyldimethylbenzylammonium chlorides, a fatty acid polyglycolic acid ester or the tertiary phosphoric acid ester of the addition product of 2 mols of ethylene oxide to 1 mol of lauryl alcohol.

The fast-to-dyeing β-modification may be obtained finally by finely dividing the α-modification with the addition of conventional dispersing agents, for example polyvinyl sulfonates, condensation products of naphthalene-sulfonic acid and formaldehyde or of phenol, formaldehyde and sodium bisulfite, alkali metal salts of ligninsulfonates or sulfite cellulose liquor, at a temperature from about 60° to 90° C. For example the fast-to-dyeing β-modification may be separated from the liquid phase by filtration and be subsequently submitted to a known finish while adding dispersing agents, such as polyvinylsulfonates, condensation products of naphthalene-sulfonic acid and formaldehyde or of phenolformaldehyde and sodium bisulfite, alkali metal salts of ligninsulfonates or sulfite cellulose liquor, at the usual temperatures. Conventional devices such as ball mills or sand mills are suitable for finely dividing.

The preparations may further contain additives such as preservation agents (in the case of liquid preparations), dedusting agents, cross-linking agents, antifoaming agents or antifreezing agents (in the case of liquid preparations).

The liquid or pulverulent preparations of the fast-to-dyeing β-modification obtained in the above manner, contrary to comparable preparations of the α-modification, are suitable for dyeing textile materials consisting of cellulose fibers, of synthetic linear polyesters, such as polyethylene glycol terephthalate or of blended fabrics of such polyesters and wool or rayon, at a temperature from 100° to 200° C.

The preparations containing the fast-to-dyeing β-modification do not precipitate in aqueous medium under the action of high temperatures, which is particularly important for the dyeing of packages, in particular of cross-wound packages. The superiority of the compositions containing the fast-to-dyeing β-modification in practice becomes evident in various dyeing tests that give far better test results.

For example, this superiority may be shown by the heat-stability test, which is a criterion for the stability of the liquor and by the Praxi test performed with blended fabrics, such as those of polyester fibers and rayon. The Praxi test is used for determining whether or not preparations of disperse dyes are appropriate for dyeing packages, with little expenditure under conditions to be found in practice.

The following examples illustrate the invention. Parts and percentages are by weight, unless otherwise stated.

EXAMPLE 1

100 Parts of the dyestuff (α-modification) obtained by diazotizing 2-chloro-4-nitroaniline in aqueous hydrochloric acid and by coupling the resulting diazonium compound with 3-(N,N-diacetoxyethyl)-amino-propionic acid anilide dissolved in dilute hydrochloric acid are heated to 80° C. for approximately 4 hours in aqueous suspension, upon adjusting the pH to about 4.

During heating the α-modification unstable under dyeing conditions is converted into the fast-to-dyeing β-modification. The dyestuff is filtered off and ground in a bead mill in conjunction with 110 parts of a condensation product of cresol, formaldehyde and sodium bisulfite, with 20 parts of the sodium salt of diisobutylnaphthalene-sulfonic acid and water, at a temperature of at most 50° C., until a satisfactory fine distribution is reached. The preparation is subsequently dried in a spraying apparatus.

Upon drying the desired content of pure dyestuff is adjusted by adding the sodium salt of dinaphthylmethansulfonic acid. The resulting powder complies with all technical requirements imposed thereon.

EXAMPLE 2

100 Parts of the monoazo dye (α-modification) obtained according to the procedure of Example 1, whose pH has been adjusted to approximately 4, are heated for three hours in an aqueous suspension to 90° C., which gives the fast-to-dying β-modification. The filter cake humid from suction is ground in conjunction with 60 parts of a condensation product of cresol, formaldehyde and sodium bisulfite, with 60 parts of the sodium salt of a ligninsulfonate and with 20 parts of the sodium salt of diisobutylnaphthalene-sulfonic acid, dried and the resulting product is adjusted to the desired content of pure dyestuff.

The resulting pulverulent preparation complies with any requirements imposed thereon in practice.

EXAMPLE 3

100 Parts of the monoazo dye (α-modification) humid with water and which has been obtained by diazotizing 2-chloro-4-nitroaniline in aqueous hydrochloric acid and by coupling the resulting diazonium compound with 3-(N,N-diacetoxethyl)aminopropionic acid anilide dissolved in dilute hydrochloric acid, are ground in a bead mill at 75° to 80° C., in cojunction with 110 parts of a condensation product of cresol, formaldehyde and sodium bisulfite and with 20 parts of the sodium salt of diisobutylnaphthalene-sulfonic acid and with water, until a satisfactory fine distribution is reached. During grinding the α-modification unstable under dyeing conditions is converted into the fast-to-dyeing β-modification. The preparation is dried in a spray apparatus in the manner described in Example 1 and adjusted to the desired content of pure dyestuff.

EXAMPLE 4

100 Parts of the monoazo dye (α-modification) obtained according to Example 3 are heated in an aqueous suspension containing 10% of glycol for four hours, at 70° to 80° C., allowed to cool and suction-filtered. The filter cake humid from suction (β-modification) is made up into a paste by using 100 parts of the sodium salt of a ligninsulfonic acid and ground in a bead mill with cooling until a satisfactory fine distribution is reached. A liquid dyestuff preparation having good coloring properties and a good stability to storage is obtained.

EXAMPLE 5

100 Parts of the monoazo dyestuff obtained according to Example 3 are stirred for 3 hours at 90° C. in an aqueous suspension containing 0.5 volume % of tertiary organic phosphoric acid ester of the reaction product of lauryl alcohol with 2 mols of ethylene oxide. The dyestuff is filtered off and ground in the manner described in Example 1.

A liquid dyestuff preparation having excellent stability to storage and good coloring properties is obtained.

We claim:

1. The modification β being stable under dyeing conditions of the dyestuff of the formula

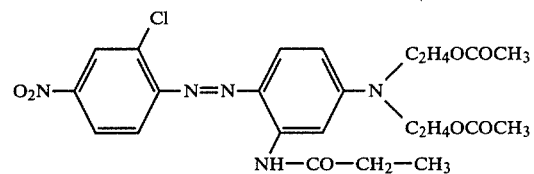

being characterized by an X-ray diffraction pattern as shown in FIG. 1 with characteristic reflexes at the following glance angles ⊖ with the relative intensities:

| θ | 3.71 | 6.62 | 7.85 | 8.6 | 9.43 | 10.51 | 11.8 | 12.57 |
|---|------|------|------|-----|------|-------|------|-------|
| relative intensity | 67 | 44 | 34 | 36 | 60 | 60 | 46 | 100 |

* * * * *